(12) United States Patent
Bian

(10) Patent No.: US 11,733,458 B2
(45) Date of Patent: Aug. 22, 2023

(54) EDGE COUPLERS WITH CONFINING FEATURES

(71) Applicant: GLOBALFOUNDRIES U.S. Inc., Malta, NY (US)

(72) Inventor: Yusheng Bian, Ballston Lake, NY (US)

(73) Assignee: GlobalFoundries U.S. Inc., Malta, NY (US)

( * ) Notice: Subject to any disclaimer, the term of this patent is extended or adjusted under 35 U.S.C. 154(b) by 0 days.

(21) Appl. No.: 17/493,260

(22) Filed: Oct. 4, 2021

(65) Prior Publication Data

US 2023/0104227 A1   Apr. 6, 2023

(51) Int. Cl.
G02B 6/12   (2006.01)
G02B 6/122   (2006.01)
G02B 6/13   (2006.01)

(52) U.S. Cl.
CPC .......... *G02B 6/1228* (2013.01); *G02B 6/13* (2013.01); *G02B 2006/12061* (2013.01)

(58) Field of Classification Search
CPC .............................. G02B 6/1228; G02B 6/305
See application file for complete search history.

(56) References Cited

U.S. PATENT DOCUMENTS

| | | | | |
|---|---|---|---|---|
| 5,432,872 A | * | 7/1995 | Stewart | G02B 6/2804 385/27 |
| 10,816,726 B1 | | 10/2020 | Peng et al. | |
| 10,989,876 B1 | | 4/2021 | Peng et al. | |
| 11,204,469 B1 | * | 12/2021 | Krueger | G02B 6/305 |
| 2012/0230635 A1 | * | 9/2012 | Yoshida | G02B 6/125 385/43 |
| 2013/0170807 A1 | * | 7/2013 | Hatori | G02B 6/036 385/129 |
| 2014/0233881 A1 | * | 8/2014 | Hatori | G02B 6/12002 385/14 |
| 2015/0247974 A1 | * | 9/2015 | Painchaud | G02B 6/12004 385/28 |
| 2019/0086611 A1 | * | 3/2019 | Daniel | G02B 6/305 |

(Continued)

FOREIGN PATENT DOCUMENTS

| | | | |
|---|---|---|---|
| CN | 114460682 A | * | 5/2022 |
| CN | 114624821 A | * | 6/2022 |

OTHER PUBLICATIONS

Bian et al., "Confining Features for Mode Shaping of Lasers and Coupling With Silicon Photonic Components", filed Feb. 4, 2021 as U.S. Appl. No. 17/167,201.

(Continued)

*Primary Examiner* — Michael Stahl
(74) *Attorney, Agent, or Firm* — Thompson Hine LLP; Anthony Canale

(57) ABSTRACT

Structures including an edge coupler and methods of fabricating a structure including an edge coupler. The structure includes a first waveguide core having a first inverse taper, a second waveguide core having a second inverse taper, and a third waveguide core having a third inverse taper that is laterally positioned between the first inverse taper and the second inverse taper. The structure further includes a fourth waveguide core having a fourth inverse taper that is positioned to overlap with the first inverse taper, and a fifth waveguide core having a fifth inverse taper that is positioned to overlap with the second inverse taper.

20 Claims, 17 Drawing Sheets

(56) References Cited

U.S. PATENT DOCUMENTS

| | | | |
|---|---|---|---|
| 2019/0086620 A1* | 3/2019 | Chen | G02B 6/4212 |
| 2021/0231866 A1* | 7/2021 | Tu | G02B 6/12004 |

OTHER PUBLICATIONS

Bian et al., "Edge Couplers With Stacked Layering", filed Apr. 27, 2020 as U.S. Appl. No. 16/859,347.

Bian, "Edge Couplers With a Partially-Etched Inverse Taper", filed Aug. 5, 2020 as U.S. Appl. No. 16/985,645.

Krishnamurthy et al., "Optical Power Splitters With a Tailored Splitting Ratio", filed Jun. 25, 2021 as U.S. Appl. No. 17/358,255.

Bian, "Heterogenous Optical Power Splitter/Combiner", filed Sep. 21, 2020 as U.S. Appl. No. 17/026,799.

Sahin et al., "Methods of Forming a V-Groove for a Fiber Optics Cable on an Integrated Photonics Chip" filed Mar. 3, 2020 as U.S. Appl. No. 16/807,811.

N. Hatori et al., "A Hybrid Integrated Light Source on a Silicon Platform Using a Trident Spot-Size Converter," in Journal of Lightwave Technology, vol. 32, No. 7, pp. 1329-1336, Apr. 1, 2014.

G. Roelkens, D. Van Thourhout, R. Baets, R. Notzel, and M. Smit, "Laser emission and photodetection in an InP/InGaAsP layer integrated on and coupled to a Silicon-on-Insulator waveguide circuit," Opt. Express 14, 8154-8159 (2006).

Y.-C. Tu, P.-H. Fu and D.-W. Huang, "High-Efficiency Ultra-Broadband Multi-Tip Edge Couplers for Integration of Distributed Feedback Laser With Silicon-on-Insulator Waveguide," in IEEE Photonics Journal, vol. 11, No. 4, pp. 1-13, Aug. 2019, Art No. 6602113.

K. Giewont et al., "300-mm Monolithic Silicon Photonics Foundry Technology," in IEEE Journal of Selected Topics in Quantum Electronics, vol. 25, No. 5, pp. 1-11, Sep.-Oct. 2019, Art No. 8200611.

Y. Bian et al., "3D Integrated Laser Attach Technology on 300-mm Monolithic Silicon Photonics Platform," 2020 IEEE Photonics Conference (IPC), 2020, pp. 1-2.

M. RakowsKi, C. Meagher, K. Nummy, A. Aboketat, J. Ayala, Y. Bian, B. Harns, K. McLean, K. McStay, A. Sanin, L. Medina, B. Peng, Z. Sowinski, A. Stricker, T. Houghton, C. Hedges, K. Giewont, A. Jacob, T. Letavic, D. Riggs, A. Yu, and J. Pellerin, "45nm CMOS—Silicon Photonics Monolithic Technology (45CLO) for next-generation, low power and high speed optical interconnects," in Optical Fiber Communication Conference (OFC) 2020, OSA Technical Digest (Optical Society of America, 2020), paper T3H.3.

Y. Bian, et al., "Towards low-loss monolithic silicon and nitride photonic building blocks in state-of-the-art 300mm CMOS foundry," in Frontiers in Optics / Laser Science, B. Lee, C. Mazzali, K. Corwin, and R. Jason Jones, eds., OSA Technical Digest (Optical Society of America, 2020), paper FW5D.2.

Mu, Xin, Sailong Wu, Lirong Cheng, and H.Y. Fu 2020. "Edge Couplers in Silicon Photonic Integrated Circuits: A Review" Applied Sciences 10, No. 4: 1538.

Y. Bian et al., "Monolithically integrated silicon nitride platform," 2021 Optical Fiber Communications Conference and Exhibition (OFC), 2021, pp. 1-3.

Y. Bian, et al., "Hybrid III-V laser integration on a monolithic silicon photonic platform," in Optical Fiber Communication Conference (OFC) 2021, P. Dong, J. Kani, C. Xie, R. Casellas, C. Cole, and M. Li, eds., OSA Technical Digest (Optica Society of America, 2021), paper M5A.2.

A. Aboketaf, et al., "Towards fully automated testing and characterization for photonic compact modeling on 300-mm wafer platform," in Optical Fiber Communication Conference (OFC) 2021, P. Dong, J. Kani, C. Xie, R. Casellas, C. Dole, and M. Li, eds., OSA Technical Digest (Optical Society of America, 2021), paper W6A.1.

M. Teng, B. Niu, K. Han, S. Kim, Y. Xuan, Y. J. Lee, and M. Qi, "Trident shape SOI metamaterial fiber-to-chip edge coupler," in Optical Fiber Communication Conference (OFC) 2019, OSA Technical Digest (Optical Society of America, 2019), paper Tu2J.6.

\* cited by examiner

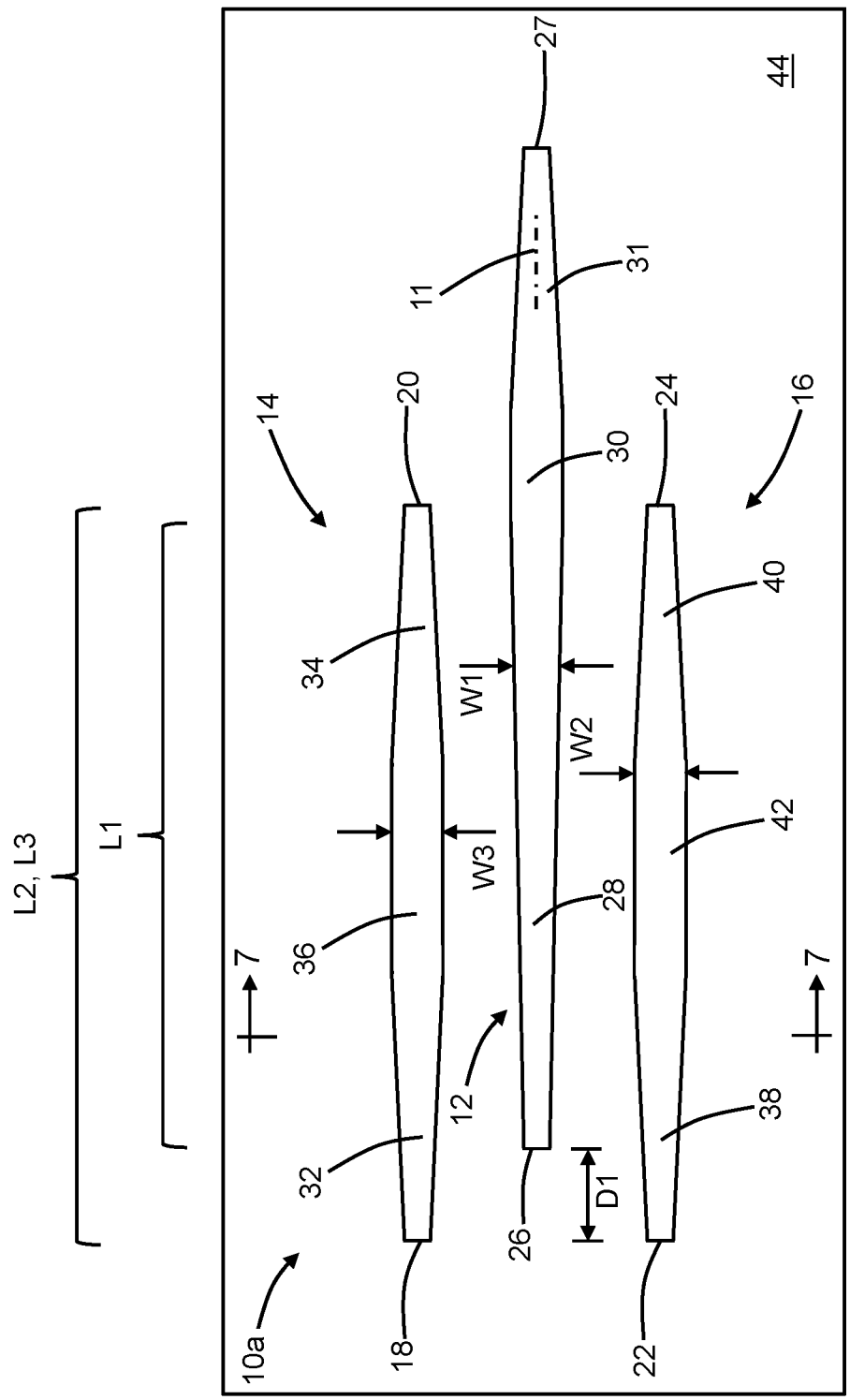

EDGE COUPLERS WITH CONFINING FEATURES

BACKGROUND

The present invention relates to photonics chips and, more specifically, to structures for an edge coupler and methods of fabricating a structure for an edge coupler.

Photonics chips are used in many applications and systems including, but not limited to, data communication systems and data computation systems. A photonics chip integrates on-chip optical components, such as waveguides, photodetectors, modulators, and optical power splitters, and on-chip electronic components, such as field-effect transistors, into a unified platform. Among other factors, layout area, cost, and operational overhead may be reduced by the integration of both types of components on the same chip.

An edge coupler, also known as a spot-size converter, is commonly used for coupling light of a given mode from a laser to optical components on the photonics chip. The edge coupler may include a waveguide core section that defines an inverse taper. In the edge coupler construction, the narrow end of the inverse taper defines a facet that is arranged proximate to the laser, and the wide end of the inverse taper is connected to another waveguide core section that routes the light to optical components on the photonics chip.

The gradually-varying cross-section area of an inverse taper supports mode transformation and mode size variation associated with mode conversion when receiving light from a laser. The narrow end at the tip of the inverse taper is unable to fully confine the incident mode because the cross-sectional area of the tip at its narrow end is smaller than the mode size. Consequently, a significant percentage of the electromagnetic field of the incident mode is distributed about the tip of the inverse taper. As its width increases, the inverse taper can support the entire incident mode and eventually confine the electromagnetic field inside the inverse taper.

Edge couplers may be characterized by a low coupling efficiency because of mismatches in mode shape and mode size with the laser. Edge couplers may exhibit significant insertion loss, as well as exhibit significant back reflection at the facet. Edge couplers may also be susceptible to power-related damage because of poor power handling capability.

Improved structures including an edge coupler and methods of fabricating a structure including an edge coupler are needed.

SUMMARY

In an embodiment of the invention, a structure for an edge coupler is provided. The structure includes a first waveguide core having a first inverse taper, a second waveguide core having a second inverse taper, and a third waveguide core having a third inverse taper that is laterally positioned between the first inverse taper and the second inverse taper. The structure further includes a fourth waveguide core having a fourth inverse taper that is positioned to overlap with the first inverse taper, and a fifth waveguide core having a fifth inverse taper that is positioned to overlap with the second inverse taper.

In an embodiment of the invention, a structure for an edge coupler is provided. The structure includes a first waveguide core having a first inverse taper, a second waveguide core having a second inverse taper, and a third waveguide core having a third inverse taper that is laterally positioned between the first inverse taper and the second inverse taper. The structure further includes a first slab layer arranged to fully overlap with the first waveguide core, the second waveguide core, and the third waveguide core, and a second slab layer arranged to fully overlap with the first slab layer. The first and second slab layers comprise a dielectric material.

In an embodiment of the invention, a method of forming a structure for an edge coupler is provided. The method includes forming a first waveguide core that has a first inverse taper, a second waveguide core that has a second inverse taper, and a third waveguide core that has a third inverse taper laterally positioned between the first inverse taper and the second inverse taper. The method further includes forming a fourth waveguide core that has a fourth inverse taper positioned to overlap with the first inverse taper, and a fifth waveguide core that has a fifth inverse taper positioned to overlap with the second inverse taper.

BRIEF DESCRIPTION OF THE DRAWINGS

The accompanying drawings, which are incorporated in and constitute a part of this specification, illustrate various embodiments of the invention and, together with a general description of the invention given above and the detailed description of the embodiments given below, serve to explain the embodiments of the invention. In the drawings, like reference numerals refer to like features in the various views.

FIG. 6 is a top view of a structure for an edge coupler at an initial fabrication stage of a processing method in accordance with alternative embodiments of the invention.

DETAILED DESCRIPTION

Figure 1:
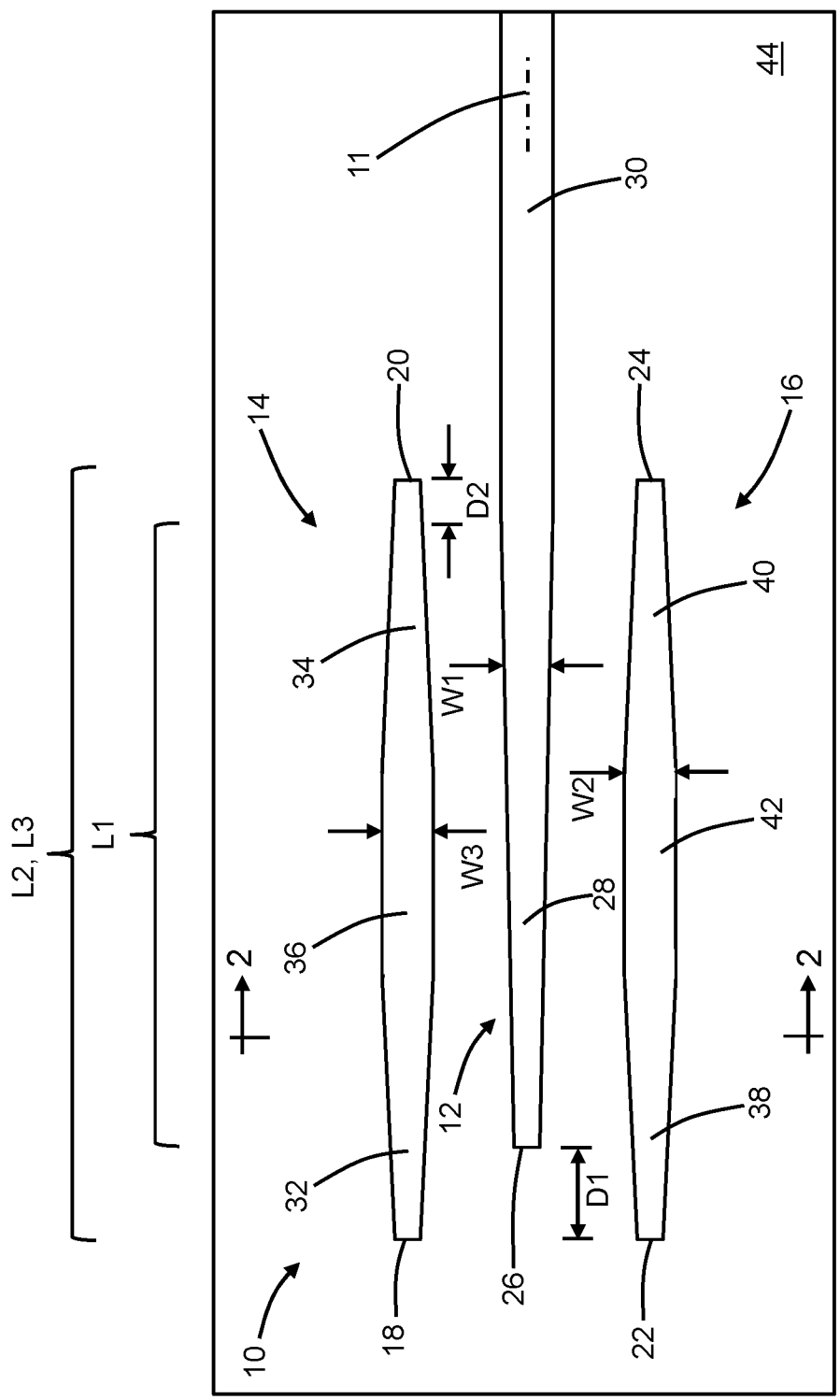
FIG. 1 is a top view of a structure for an edge coupler at an initial fabrication stage of a processing method in accordance with embodiments of the invention.
Figure 2:
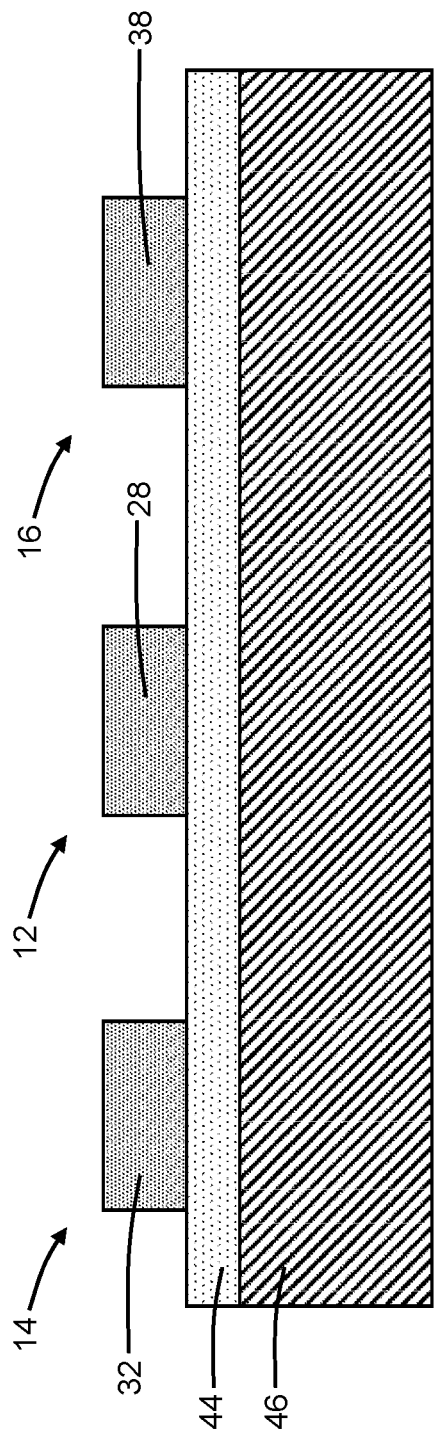
FIG. 2 is a cross-sectional view of the structure taken generally along line 2-2 in FIG. 1.
Figure 3:
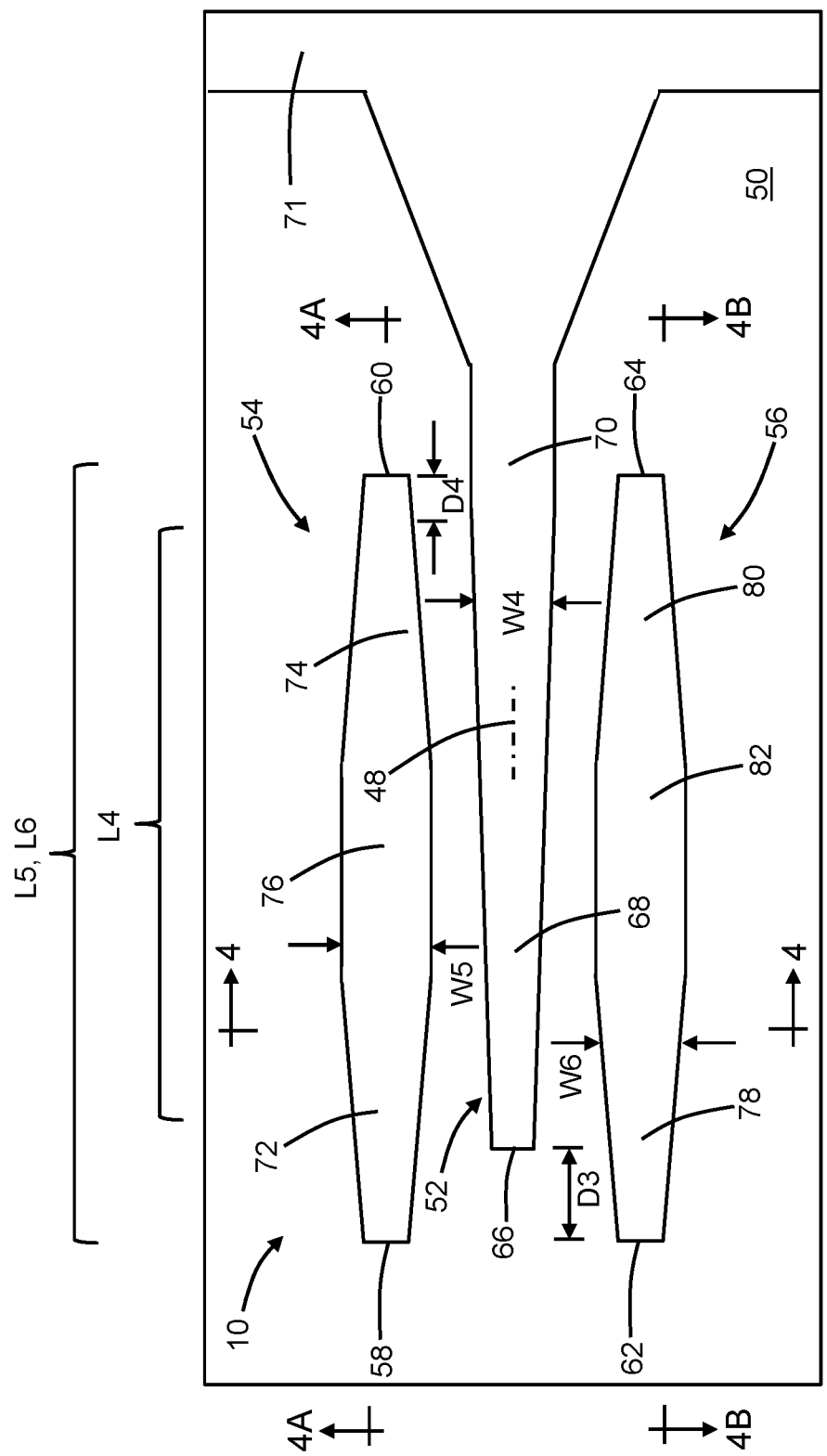
FIG. 3 is a top view of the structure at a fabrication stage subsequent to FIG. 1.

With reference to FIGS. 1, 2 and in accordance with embodiments of the invention, a structure 10 for an edge coupler (i.e., a spot-size converter) includes waveguide cores 12, 14, 16 that are positioned relative to each other in a trident arrangement. The waveguide core 12 is centrally arranged in a lateral direction between the waveguide core 14 and the waveguide core 16 in the trident arrangement. The waveguide core 14 is positioned adjacent to one side of the waveguide core 12, and the waveguide core 16 is positioned adjacent to an opposite side of the waveguide core 12.

The waveguide core 14 is truncated at opposite ends 18, 20, and the waveguide core 16 is also truncated at opposite ends 22, 24. The waveguide core 12 is truncated at an end 26 and is offset longitudinally along its longitudinal axis 11 relative to the waveguide cores 14, 16. In particular, the end 26 of the waveguide core 12 is longitudinally offset from the end 18 of the waveguide core 14 and the end 22 of the waveguide core 16 by an offset distance D1.

The waveguide core 12 includes an inverse taper 28 as a section that terminates at the end 24 and a section 30 that is connected (e.g., directly connected) to the inverse taper 28. An inverse taper refers to a tapered section of a waveguide core characterized by a gradual increase in width along a direction of mode propagation from a light source. The waveguide core 12 has a width dimension W1 and a length dimension L1. The width dimension W1 of the inverse taper 28 increases along the length dimension L1 with increasing distance from the end 24, and the width dimension W1 of the section 30 may be constant. The section 30 of the waveguide core 12 guides light received by the edge coupler away from the structure 10. In an embodiment, the width dimension W1 of the inverse taper 28 may vary over its length based on a linear function to provide a trapezoidal shape. In an alternative embodiment, the width dimension W1 of the inverse taper 28 may vary with a curvature over its length based on a non-linear function, such as a quadratic, parabolic, sine, cosine, Bezier, or exponential function. The end 20 of the waveguide core 14 and the end 24 of the waveguide core 16 may be longitudinally offset from the junction of the inverse taper 28 and section 30 of the waveguide core 12 by an offset distance D2.

The waveguide core 14 includes an inverse taper 32 as a section that terminates at the end 18, a taper 34 as a section that terminates at the opposite end 20, and a central section 36 that connects (e.g., directly connects) the inverse taper 28 to the taper 34. A taper refers to a tapered section of a waveguide core characterized by a gradual decrease in width along a direction of mode propagation from a light source. The waveguide core 14 has a width dimension W2 and a length dimension L2. The width dimension W2 of the inverse taper 32 increases with increasing distance from the end 18, and the width dimension W2 of the taper 34 decreases with decreasing distance from the end 20 such that the inverse taper 32 and taper 34 taper in opposite directions. The width dimension W2 of the central section 36 may be constant along its portion of the length dimension L2. In an embodiment, the width dimension W2 of the inverse taper 32 and taper 34 may vary over their lengths based on a linear function to provide trapezoidal shapes. In an alternative embodiment, the width dimension W2 of the inverse taper 32 and taper 34 may vary with a curvature over their lengths based on a non-linear function, such as a quadratic, parabolic, sine, cosine, Bezier, or exponential function.

The waveguide core 16 includes an inverse taper 38 as a section that terminates at the end 22, a taper 40 as a section that terminates at the opposite end 24, and a central section 42 that connects (e.g., directly connects) these the inverse taper 38 to the taper 40. The waveguide core 16 has a width dimension W3 and a length dimension L3. In the representative embodiment, the length dimension L3 of the waveguide core 16 may be equal to the length dimension L2 of the waveguide core 14. In an embodiment, the length dimension L3 of the waveguide core 16 may be substantially equal to the length dimension L2 of the waveguide core 14.

The width dimension W3 of the inverse taper 38 increases with increasing distance from the end 22, and the width dimension W3 of the taper 40 decreases with decreasing distance from the end 24 such that the inverse taper 38 and taper 40 taper in opposite directions. The width dimension W3 of the central section 42 may be constant or substantially constant along its portion of the length dimension L3. In an embodiment, the width dimension W3 of the inverse taper 38 and taper 40 may vary over their lengths based on a linear function to provide trapezoidal shapes. In an alternative embodiment, the width dimension W3 of the inverse taper 38 and taper 40 may vary with a curvature over their lengths based on a non-linear function, such as a quadratic, parabolic, sine, cosine, Bezier, or exponential function.

The waveguide core 14 and the waveguide core 16 may be equidistantly positioned in a lateral direction from the longitudinal axis 11 of the waveguide core 12 such that the respective lateral spacings are equal. Due to the longitudinal offset between the end 24 of the waveguide core 12 and the respective ends 18, 22 of the waveguide cores 14, 16, the inverse taper 28 of the waveguide core 12 is only adjacent to the waveguide cores 14, 16 over a portion of their respective length dimensions L2, L3.

In alternative embodiments, the number of waveguide cores 14, 16 may be increased (e.g., an even number to maintain a symmetrical arrangement), the longitudinal offset distances D1, D2 may be varied, the width dimensions W1, W2, W3 may be varied, and/or the length dimensions L1, L2, L3 may be varied. Such design modifications may be used modify the modal overlap between the structure 10 and the light source (e.g., a laser).

The waveguide cores 12, 14, 16 may be positioned over a dielectric layer 44. In an embodiment, the dielectric layer 44 may be comprised of silicon dioxide. In an embodiment, the dielectric layer 44 may be a buried oxide layer of a silicon-on-insulator substrate, and the silicon-on-insulator substrate may further include a handle substrate 46 comprised of a semiconductor material (e.g., single-crystal silicon).

The waveguide cores 12, 14, 16 may be comprised of a semiconductor material, such as silicon. In an embodiment, the waveguide cores 12, 14, 16 may be concurrently formed by patterning a single-crystal silicon device layer of a silicon-on-insulator substrate with lithography and etching processes. In an alternative embodiment, the waveguide cores 12, 14, 16 may be patterned from the device layer by lithography and etching processes without etching fully through the device layer to initially form a thinned layer that connects the waveguide cores 12, 14, 16. In an embodiment, the thinned layer may be patterned to shape with a separate set of lithography and etching processes such that each of the waveguide cores 12, 14, 16 includes its own distinct thinned layer.

With reference to FIGS. 3, 4, 4A, 4B in which like reference numerals refer to like features in FIGS. 1, 2 and at a subsequent fabrication stage, a dielectric layer 50 is formed over the waveguide cores 12, 14, 16 and the dielectric layer 44. The dielectric layer 50 may be comprised of a dielectric material, such as silicon dioxide, that provides low-index cladding. The thickness of the dielectric layer 50 may be greater than the thickness of the waveguide cores 12, 14, 16 such that the waveguide cores 12, 14, 16 may be embedded in the dielectric layer 50.

The structure 10 further includes waveguide cores 52, 54, 56 that are positioned relative to each other in a trident arrangement. Dielectric material of the dielectric layer 50 is positioned in a vertical direction between the waveguide cores 12, 14, 16 and the waveguide cores 52, 54, 56. The waveguide core 52 is centrally arranged in a lateral direction between the waveguide core 54 and the waveguide core 56 in the trident arrangement. The waveguide core 54 is positioned adjacent to one side of the waveguide core 52, and the waveguide core 56 is positioned adjacent to an opposite side of the waveguide core 52.

The waveguide core 54 is truncated at opposite ends 58, 60, and the waveguide core 56 is also truncated at opposite ends 62, 64. The waveguide core 52 is truncated at an end 66 and is offset longitudinally along its longitudinal axis 48 relative to the waveguide cores 54, 56. As a result, the end 66 of the waveguide core 52 is longitudinally offset from the end 58 of the waveguide core 54 and the end 62 of the waveguide core 56 by an offset distance D3. In an embodiment, the offset distance D3 may be equal or approximately equal to the offset distance D1 (FIG. 1).

The waveguide core 52 includes an inverse taper 68 as a section that terminates at the end 64 and a section 70 that is connected (e.g., directly connected) to the inverse taper 68. The waveguide core 52 has a width dimension W4 and a length dimension L4. The width dimension W4 of the inverse taper 68 increases with increasing distance from the end 64. In an embodiment, the width dimension W4 of the inverse taper 68 may vary over its length based on a linear function to provide a trapezoidal shape. In an alternative embodiment, the width dimension W4 of the inverse taper 68 may vary with a curvature over its length based on a non-linear function, such as a quadratic, parabolic, sine, cosine, Bezier, or exponential function.

The waveguide core 52 is stacked in a vertical direction over the waveguide core 12. In particular, the inverse taper 68 of the waveguide core 52 is positioned to overlap with the inverse taper 28 of the waveguide core 12, and the section 70 of the waveguide core 52 is positioned to overlap with the section 30 of the waveguide core 12. In an embodiment, the inverse taper 68 may be wider than the inverse taper 28, and the inverse taper 68 may be longitudinally positioned such that the inverse taper 68 fully overlaps with the inverse taper 28. The end 60 of the waveguide core 54 and the end 64 of the waveguide core 56 may be longitudinally offset from the junction of the inverse taper 68 and section 70 of the waveguide core 52 by an offset distance D4. In an embodiment, the offset distance D4 may be equal or approximately equal to the offset distance D2 (FIG. 1).

The waveguide core 54 includes an inverse taper 72 as a section that terminates at the end 58, a taper 74 as a section that terminates at the opposite end 60, and a central section 76 that connects (e.g., directly connects) these the inverse taper 72 to the taper 74. The waveguide core 54 has a width dimension W5 and a length dimension L5. The width dimension W5 of the inverse taper 72 increases with increasing distance from the end 58, and the width dimension W5 of the taper 74 decreases with decreasing distance from the end 60 such that the inverse taper 72 and taper 74 taper in opposite directions. The width dimension W5 of the central section 76 may be constant or substantially constant along its portion of the length dimension L5. In an embodiment, the width dimension W5 of the inverse taper 72 and taper 74 may vary over their lengths based on a linear function to provide trapezoidal shapes. In an alternative embodiment, the width dimension W5 of the inverse taper 72 and taper 74 may vary with a curvature over their lengths based on a non-linear function, such as a quadratic, parabolic, sine, cosine, Bezier, or exponential function.

The waveguide core 54 is stacked in a vertical direction over the waveguide core 14. In particular, the inverse taper 72 of the waveguide core 54 is positioned to overlap with the inverse taper 32 of the waveguide core 14, the taper 74 of the waveguide core 54 is positioned to overlap with the taper 34 of the waveguide core 14, and the central section 76 of the waveguide core 54 is positioned to overlap with the central section 36 of the waveguide core 14. In an embodiment, the waveguide core 54 may be wider than the waveguide core 14, and the waveguide core 54 may be longitudinally positioned such that the inverse taper 72 fully overlaps with the inverse taper 32 and the taper 74 fully overlaps with the taper 34.

The waveguide core 56 includes an inverse taper 78 as a section that terminates at the end 62, a taper 80 as a section that terminates at the opposite end 64, and a central section 82 that connects (e.g., directly connects) these the inverse taper 78 to the taper 80. The waveguide core 56 has a width dimension W6 and a length dimension L6. In the representative embodiment, the length dimension L6 of the waveguide core 56 may be equal to the length dimension L5 of the waveguide core 54. In an embodiment, the length dimension L6 of the waveguide core 56 may be substantially equal to the length dimension L5 of the waveguide core 54.

The width dimension W6 of the inverse taper 78 increases with increasing distance from the end 62, and the width dimension W6 of the taper 80 decreases with decreasing distance from the end 64 such that the inverse taper 78 and taper 80 taper in opposite directions. The width dimension W6 of the central section 82 may be constant or substantially constant along its portion of the length dimension L6. In an embodiment, the width dimension W6 of the inverse taper 78 and taper 80 may vary over their lengths based on a linear function to provide trapezoidal shapes. In an alternative embodiment, the width dimension W6 of the inverse taper 78 and taper 80 may vary with a curvature over their lengths based on a non-linear function, such as a quadratic, parabolic, sine, cosine, Bezier, or exponential function.

The waveguide core 56 is stacked in a vertical direction over the waveguide core 16. In particular, the inverse taper 78 of the waveguide core 56 is positioned to overlap with the inverse taper 38 of the waveguide core 16, the taper 80 of the waveguide core 56 is positioned to overlap with the taper 40 of the waveguide core 16, and the central section 82 of the waveguide core 56 is positioned to overlap with the central section 42 of the waveguide core 16. In an embodiment, the waveguide core 56 may be wider than the waveguide core 16, and the waveguide core 56 may be longitudinally positioned such that the inverse taper 78 fully overlaps with the inverse taper 38 and the taper 80 fully overlaps with the taper 40.

The waveguide core 54 and the waveguide core 56 may be equidistantly positioned in a lateral direction from the longitudinal axis 48 of the waveguide core 52 such that the respective lateral spacings are equal. Due to the longitudinal offset between the end 64 of the waveguide core 52 and the respective ends 58, 62 of the waveguide cores 54, 56, the inverse taper 68 of the waveguide core 52 is only adjacent to the waveguide cores 54, 56 over a portion of their respective length dimensions L5, L6.

In alternative embodiments, the number of waveguide cores 54, 56 may be increased (e.g., an even number to maintain a symmetrical arrangement) to, for example, be matched to the number of waveguide cores 14, 16, the longitudinal offset distances D3, D4 may be varied, the width dimensions W4, W5, W6 may be varied, and/or the length dimensions L4, L5, L6 may be varied. Such design modifications may be used modify the modal overlap between the structure 10 and the light source (e.g., a laser).

The waveguide cores 52, 54, 56 may be comprised of a dielectric material, such as silicon nitride. The waveguide cores 52, 54, 56 may be formed by patterning a solid layer of the dielectric material with lithography and etching processes.

The section 70 of the waveguide core 52 further includes an inverse taper that provides a connection to a slab layer 71. The section 30 of the waveguide core 12 continues beneath the slab layer 71 to the interior of the photonics chip.

Figure 4:
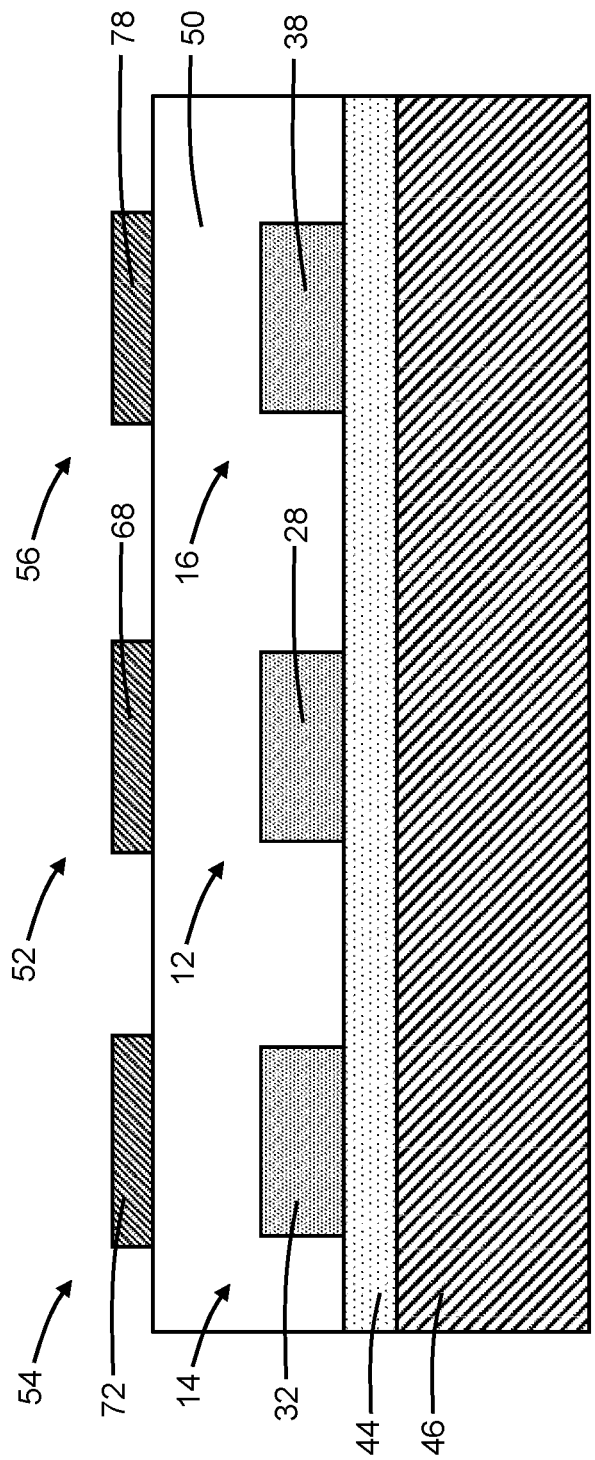
FIG. 4 is a cross-sectional view of the structure taken generally along line 4-4 in FIG. 3.
Figure 4A:
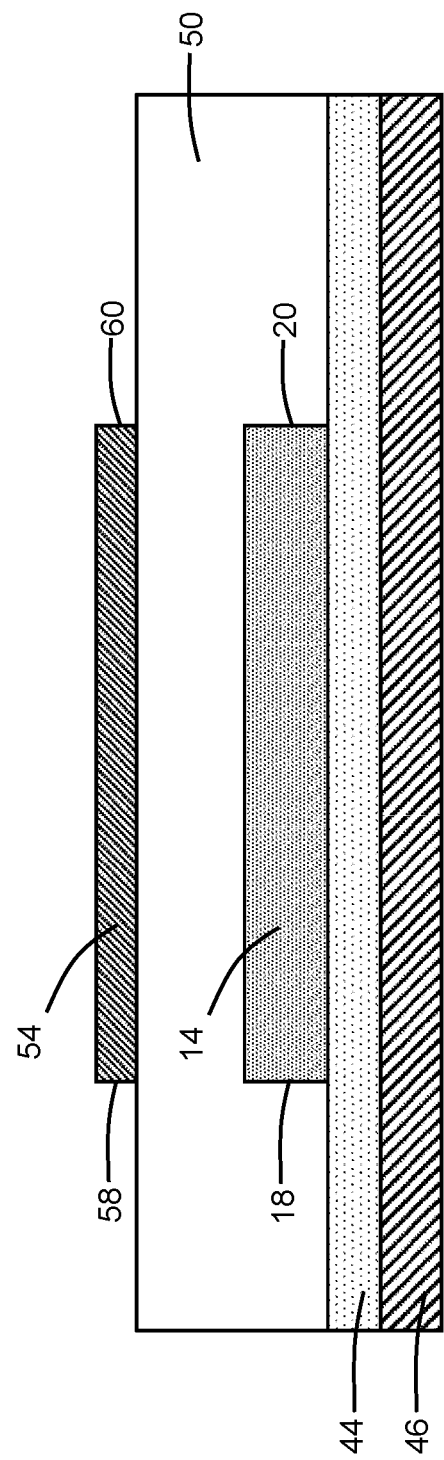
FIG. 4A is a cross-sectional view of the structure taken generally along line 4A-4A in FIG. 3.
Figure 4B:
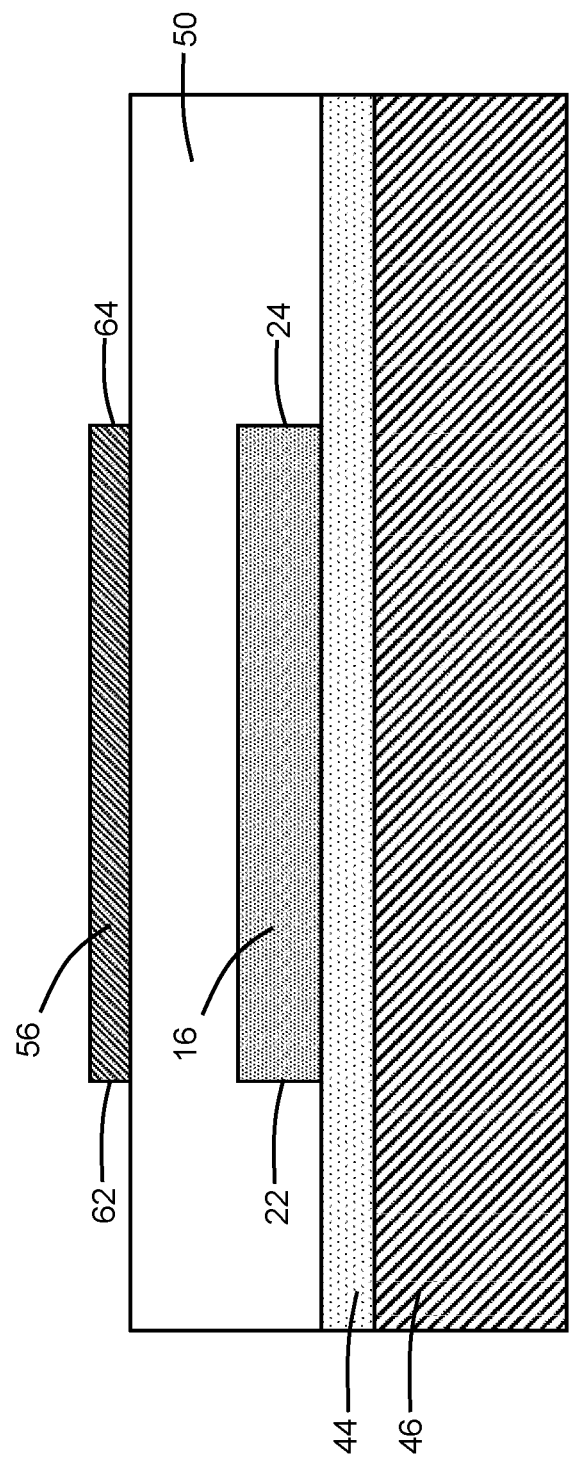
FIG. 4B is a cross-sectional view of the structure taken generally along line 4B-4B in FIG. 3.
Figure 5:
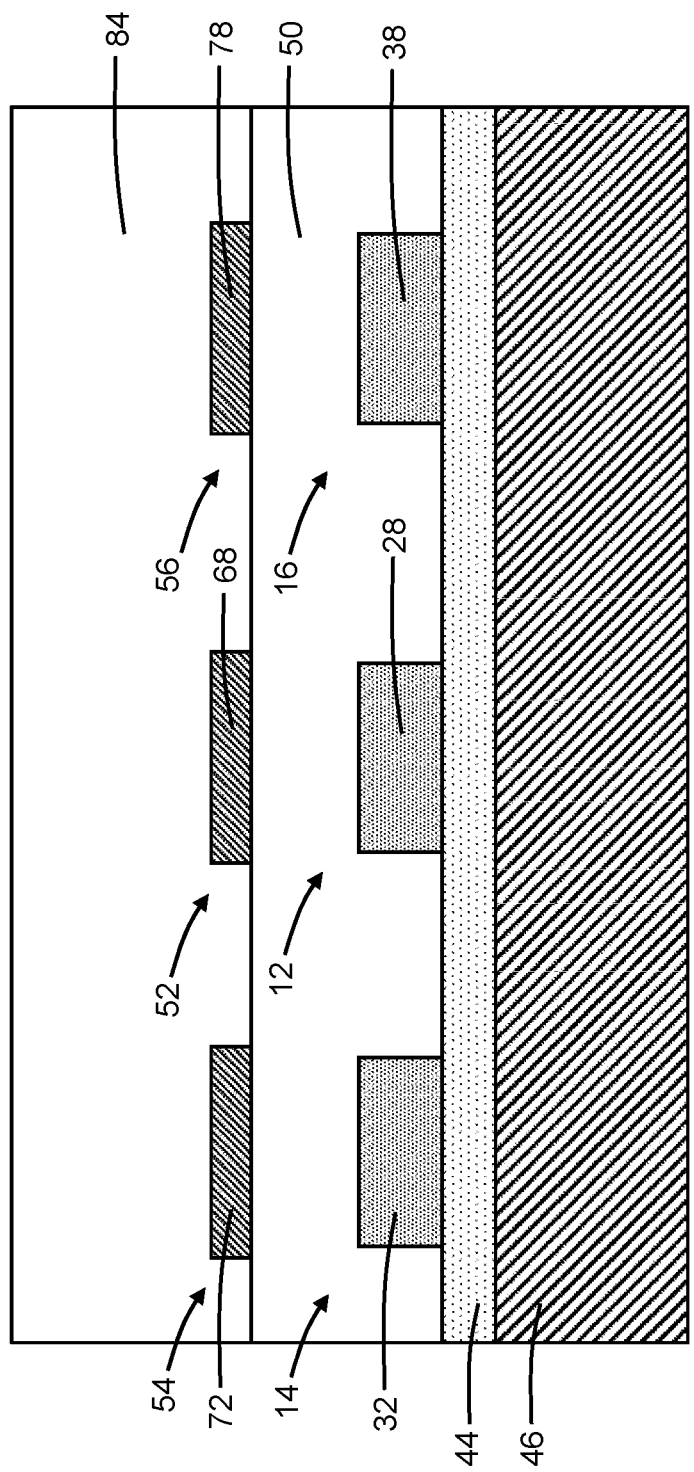
FIGS. 5, 5A, 5B are cross-sectional views of the structure at a fabrication stage subsequent to FIGS. 4, 4A, 4B.
Figure 5A:
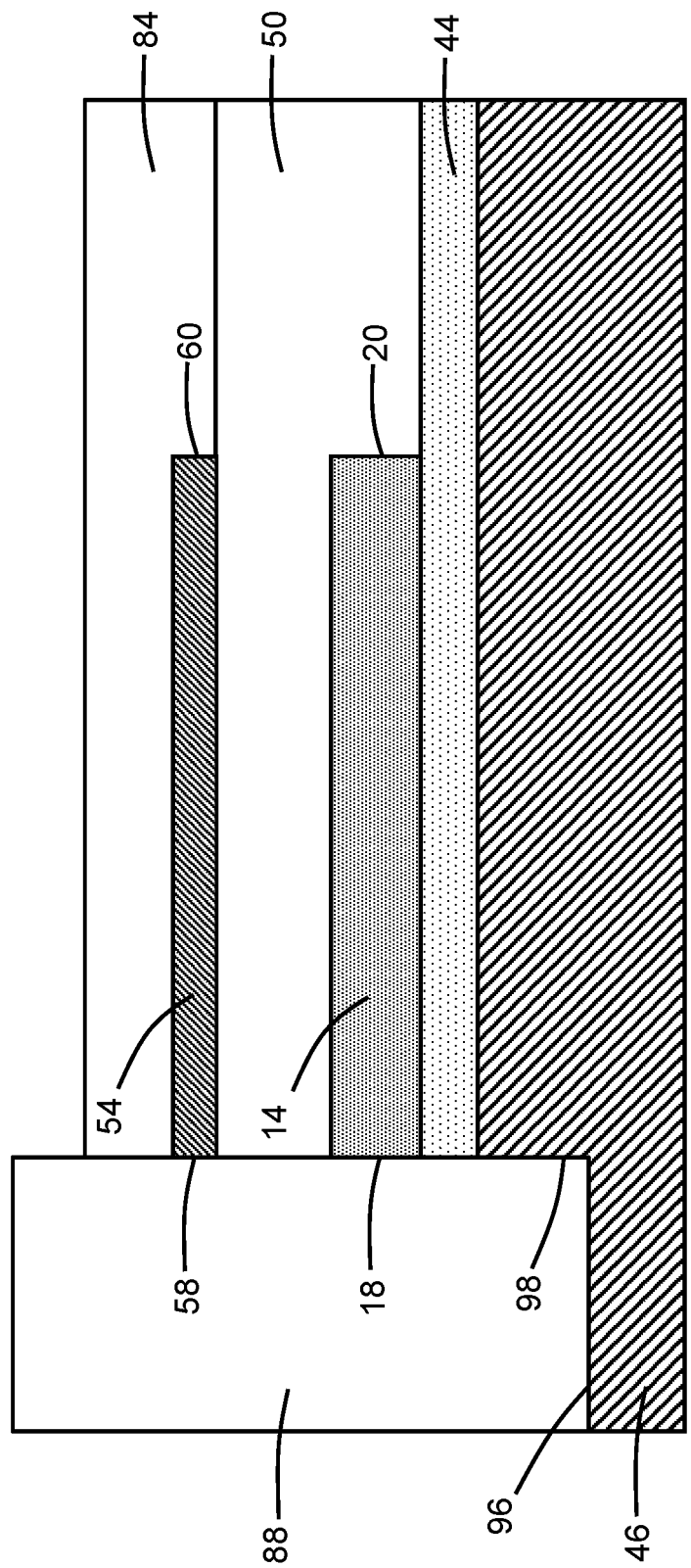
Figure 5B:
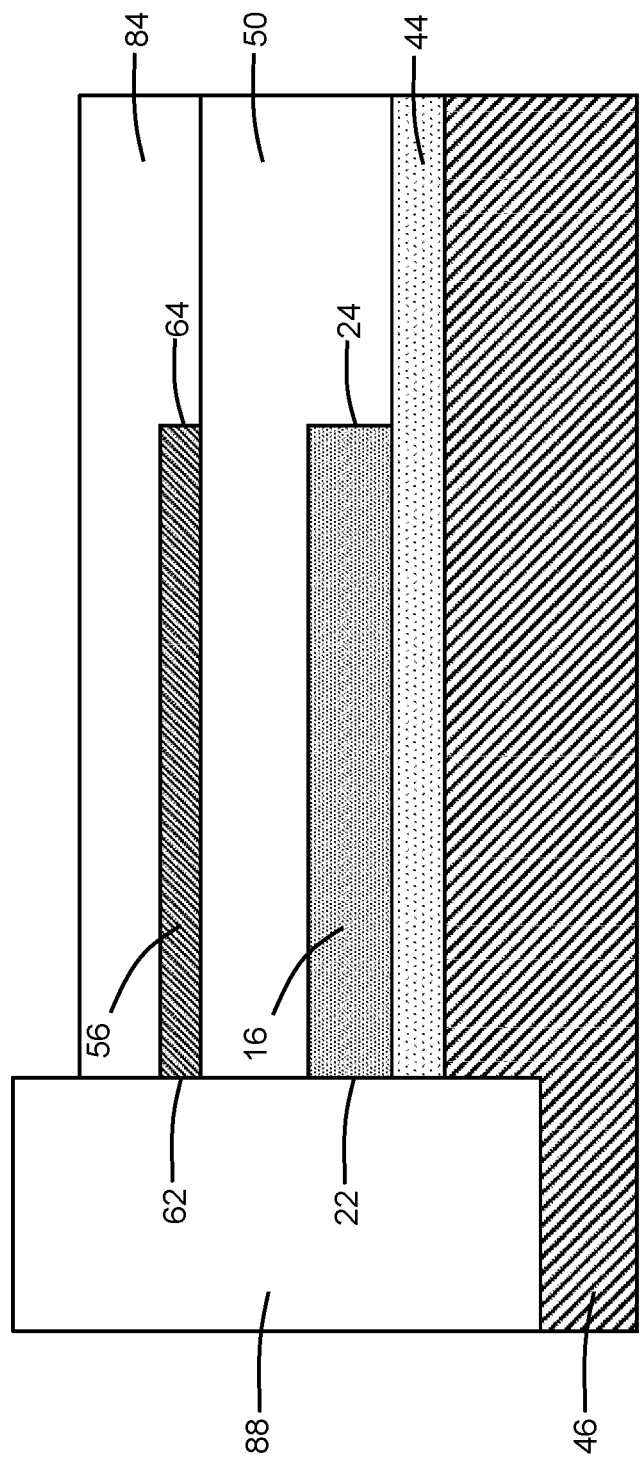

With reference to FIGS. 5, 5A, 5B in which like reference numerals refer to like features in FIGS. 4, 4A, 4B and at a subsequent fabrication stage, a dielectric layer 84 is formed over the waveguide cores 52, 54, 56. The dielectric layer 84 may be comprised of a dielectric material, such as silicon dioxide, that provides low-index cladding. The thickness of the dielectric layer 84 may be greater than the thickness of the waveguide cores 52, 54, 56 such that the waveguide cores 52, 54, 56 are embedded in the dielectric layer 84. The dielectric layer 84 may replace a portion of a back-end-of-line stack that is removed when forming a cavity in the handle substrate 46 into which a laser 88 is assembled.

The laser 88 may provide a light source that is configured to emit laser light of a given wavelength, intensity, mode shape, and mode size. The laser 88 is positioned adjacent to the inverse tapers 28, 32, 38 of the waveguide cores 12, 14, 16 and the inverse tapers 68, 72, 78 of the waveguide cores 52, 54, 56. In an embodiment, the waveguide cores 12, 14, 16 and waveguide cores 52, 54, 56 may be oriented parallel to the direction of light emission from the laser 88. In an embodiment, the waveguide cores 12, 14, 16 and waveguide cores 52, 54, 56 may be rotated to be tilted at an angle relative to the direction of light emission from the laser 88. In an alternative embodiment, the laser 88 may be replaced by an optical fiber as the light source.

In an embodiment, the laser 88 may be abutted with the structure 10. The laser 88 may be comprised of III-V compound semiconductor materials. For example, the laser 88 may be an indium phosphide/indium-gallium-arsenic phosphide laser that is configured to generate and output continuous laser light in an infrared wavelength range. For example, the laser 88 may generate and output laser light at a nominal peak wavelength of 1310 nm or at a nominal peak wavelength of 1550 nm. The laser 88 may be located on the photonics chip including the structure 10. For example, the laser 88 may be separately manufactured and may be attached by, for example, flip-chip bonding to surfaces surrounding a cavity 96 that is patterned in the handle substrate 46. The end 18 of the waveguide core 14 terminating the inverse taper 32, the end 22 of the waveguide core 16 terminating the inverse taper 38, the end 58 of the waveguide core 54 terminating the inverse taper 72, and the end 62 of the waveguide core 56 terminating the inverse taper 78 are positioned adjacent to an edge 98 of the cavity 96. The end 26 terminating the inverse taper 28 is longitudinally offset relative to the ends 18, 22 in a direction away from the edge 98 of the cavity 96, and the end 66 terminating the inverse taper 68 is longitudinally offset relative to the ends 58, 62 in a direction away from the edge 98 of the cavity 96.

The structure 10, in any of its embodiments described herein, may be integrated into a photonics chip that includes electronic components and additional optical components. For example, the electronic components may include field-effect transistors that are fabricated by complementary metal-oxide-semiconductor (CMOS) front-end-of-line (FEOL) processing.

In use, light from the laser 88 is initially guided by the waveguide cores 14, 16 with the waveguide cores 54, 56 providing enhanced light confinement and optical coupling. The light propagating within the structure 10 reaches the waveguide core 12 such that the mode of the propagating light transitions to being guided by all of the waveguide cores 12, 14, 16 with the waveguide cores 52, 54, 56 providing enhanced light confinement and optical coupling. The proportion of the mode confined by the waveguide core 12 tends to increase as the width of the inverse taper 28 increases and, concomitantly, as the widths of the waveguide cores 14, 16 decrease. Finally, when the waveguide cores 14, 16 end, the mode is totally converted into the central waveguide core 12 and guided by the waveguide core 12 away from the structure 10 to optical components in the chip interior.

The structure 10 provides a monolithically-integrated edge coupler for efficient butt-end light coupling with the laser 88. The waveguide cores 52, 54, 56 may define confining features that strengthen the optical coupling of light from the laser 88 to the waveguide cores 12, 14, 16. The contribution of the waveguide cores 52, 54, 56 to the structure 10 may improve mode matching (i.e., the matching of mode shape and/or mode size) with the laser output to enhance the efficiency of the light coupling. The addition of the waveguide cores 52, 54, 56 may reduce the coupling loss and back reflection exhibited by the edge coupler, and may improve the transmission efficiency exhibited by the edge coupler. In addition, the formation of the waveguide cores 52, 54, 56 may be fully compatible with CMOS processes.

Figure 7:
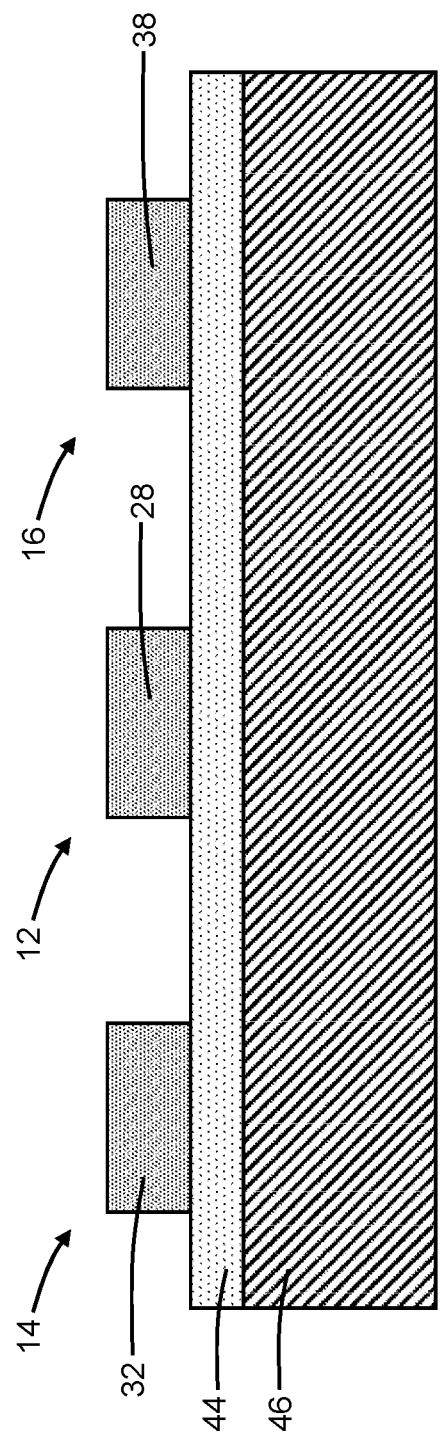
FIG. 7 is a cross-sectional view of the structure taken generally along line 7-7 in FIG. 6.

With reference to FIGS. 6, 7 and in accordance with alternative embodiments of the invention, a structure 10a for an edge coupler (i.e., a spot-size converter) includes the waveguide cores 12, 14, 16 that are positioned in the trident arrangement. The waveguide core 12 is modified to be truncated at an end 27 that is opposite to the end 26. The waveguide core 12 further includes a taper 31 that is connected to the section 30 and that terminates at the end 27.

Figure 8:
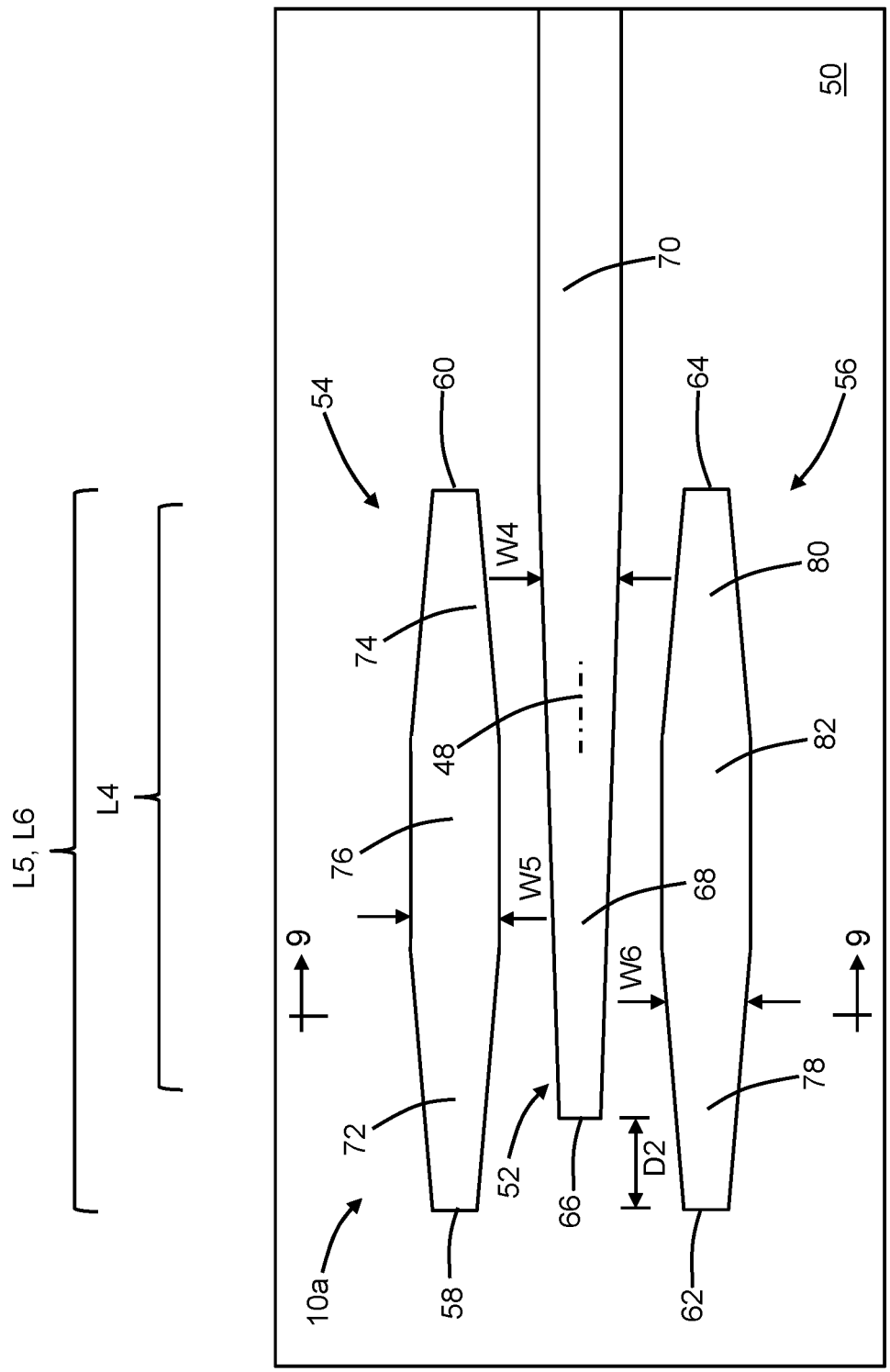
FIG. 8 is a top view of the structure at a fabrication stage subsequent to FIG. 6.
Figure 9:
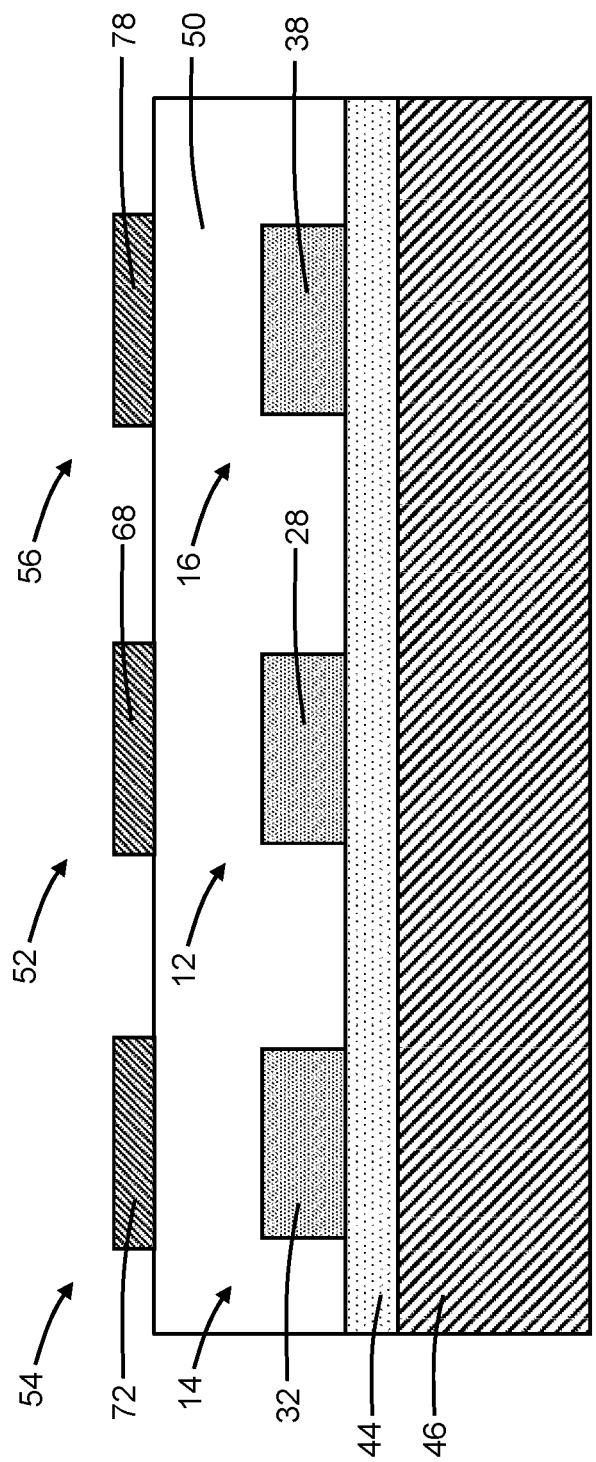
FIG. 9 is a cross-sectional view of the structure taken generally along line 9-9 in FIG. 8.

With reference to FIGS. 8, 9 in which like reference numerals refer to like features in FIGS. 6, 7 and at a subsequent fabrication stage, the structure 10a includes the waveguide cores 52, 54, 56 that are positioned in the trident arrangement. The section 70 of the waveguide core 52, instead of terminating with a connection to the slab layer 71, extends into the interior of the photonics chip such that light can be guided to additional optical components located on the photonics chip. The waveguide cores 12, 14, 16 function as confining features located beneath the waveguide cores 52, 54, 56 that strengthen the optical coupling of light from the laser 88 to the waveguide cores 52, 54, 56.

Figure 10:
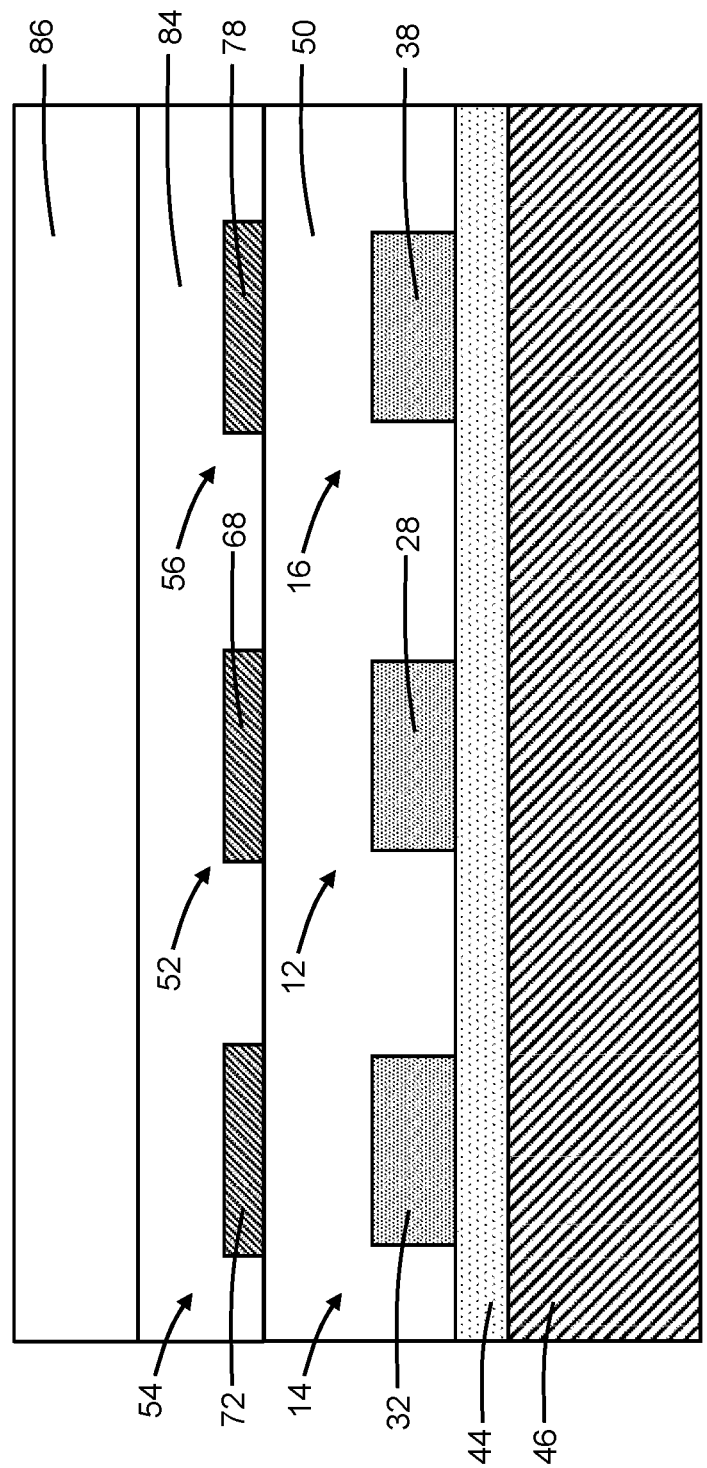
FIG. 10 is a cross-sectional view of the structure at a fabrication stage subsequent to FIG. 9.

With reference to FIG. 10 in which like reference numerals refer to like features in FIG. 9 and at a subsequent fabrication stage, the dielectric layer 84 is formed over the waveguide cores 52, 54, 56, and the laser 88 is assembled to the photonics chip as a light source.

Figure 11:
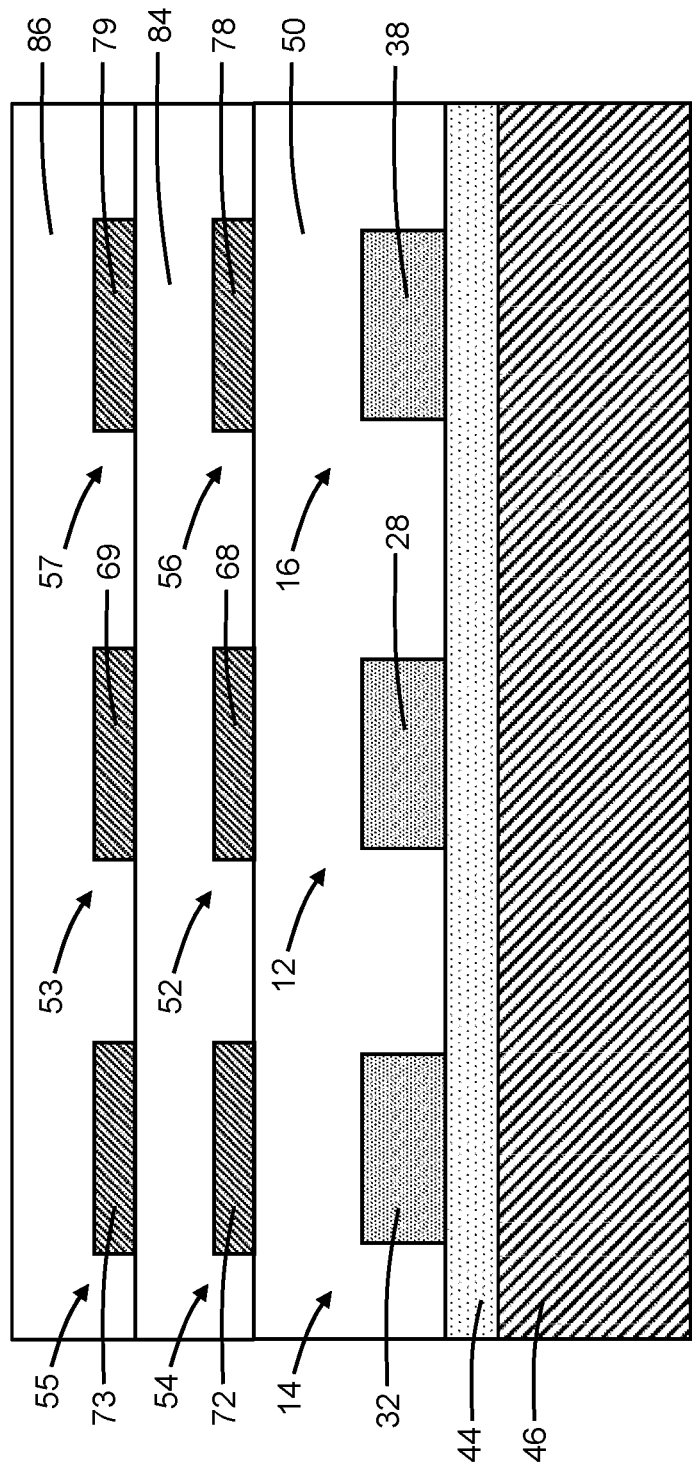
FIG. 11 is a cross-sectional view of a structure in accordance with alternative embodiments of the invention.

With reference to FIG. 11 and in accordance with alternative embodiments of the invention, the structure 10 may be modified to add an additional set of waveguide cores 53, 55, 57 on the dielectric layer 84 that are identical or substantially identical to the waveguide cores 52, 54, 56 in construction and in material of construction. The waveguide core 53 is positioned in a vertical direction over the waveguide core 52 with an overlapping arrangement, the waveguide core 55 is positioned in a vertical direction over the waveguide core 54 with an overlapping arrangement, and waveguide core 57 is positioned in a vertical direction over the waveguide core 56 with an overlapping arrangement. Each of the waveguide cores 53, 55, 57 includes sections that match and correspond to the sections of the waveguide cores 52, 54, 56. For example, the waveguide core 55 includes an inverse taper 69 that overlaps with the inverse taper 68 of the waveguide core 52, the waveguide core 55 includes an inverse taper 73 that overlaps with the inverse taper 72 of the waveguide core 54, and the waveguide core 57 includes an inverse taper 79 that overlaps with the inverse taper 78 of the waveguide core 56. The addition of the waveguide cores 53, 55, 57 may strengthen the light confinement in comparison with the utilization of the single set of waveguide cores 52, 54, 56 alone.

Figure 12:
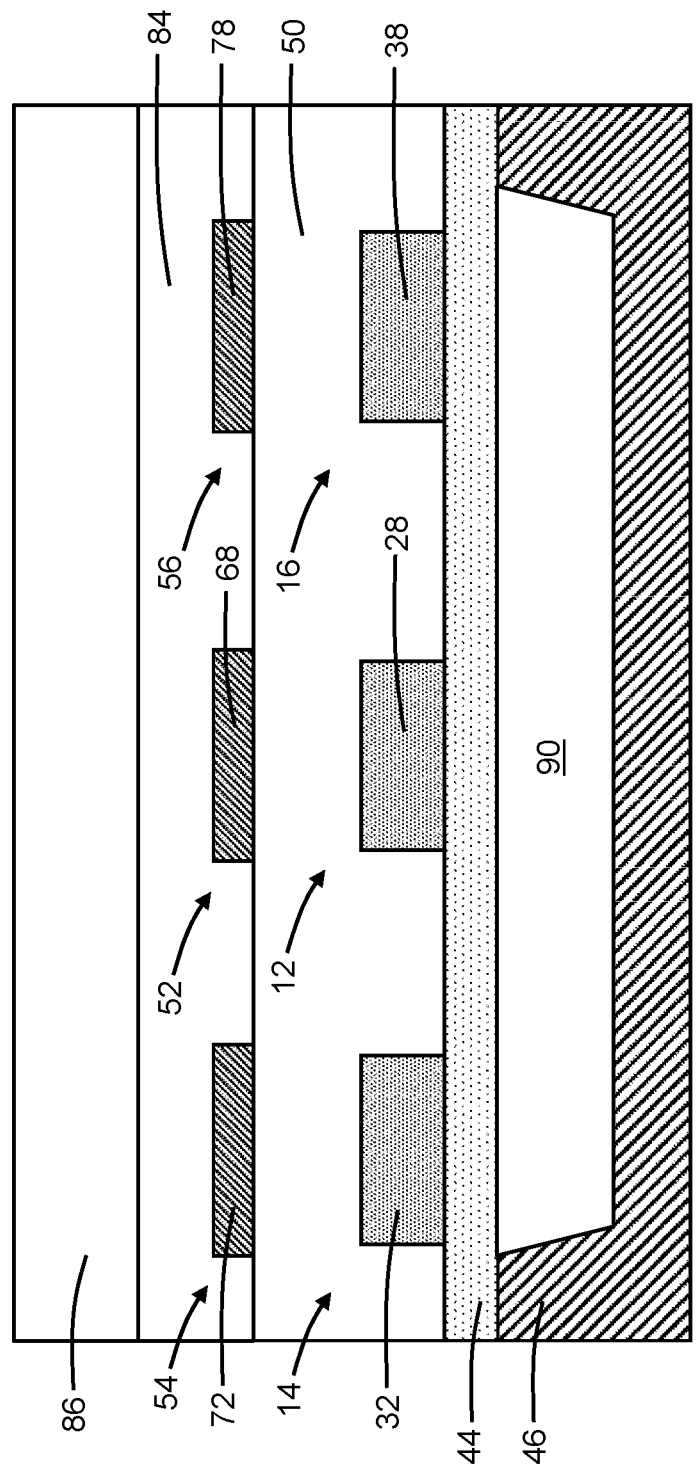
FIG. 12 is a cross-sectional view of a structure in accordance with alternative embodiments of the invention.

With reference to FIG. 12 and in accordance with alternative embodiments of the invention, an undercut 90 may be formed in the handle substrate 46 and may extend laterally beneath the dielectric layer 44. The undercut 90 is located under at least a portion of the structure 10. In an embodiment, the undercut 90 may be located under the entirety of the structure 10. The undercut 90 may function to minimize substrate-induced leakage loss for the laser light originating from the laser 88 and, in particular, laser light with a large mode size. The undercut 90 may extend from the cavity 96 (FIGS. 5A, 5B) in the handle substrate 46, into which the laser 88 is assembled, beneath the dielectric layer 44.

Figure 13:
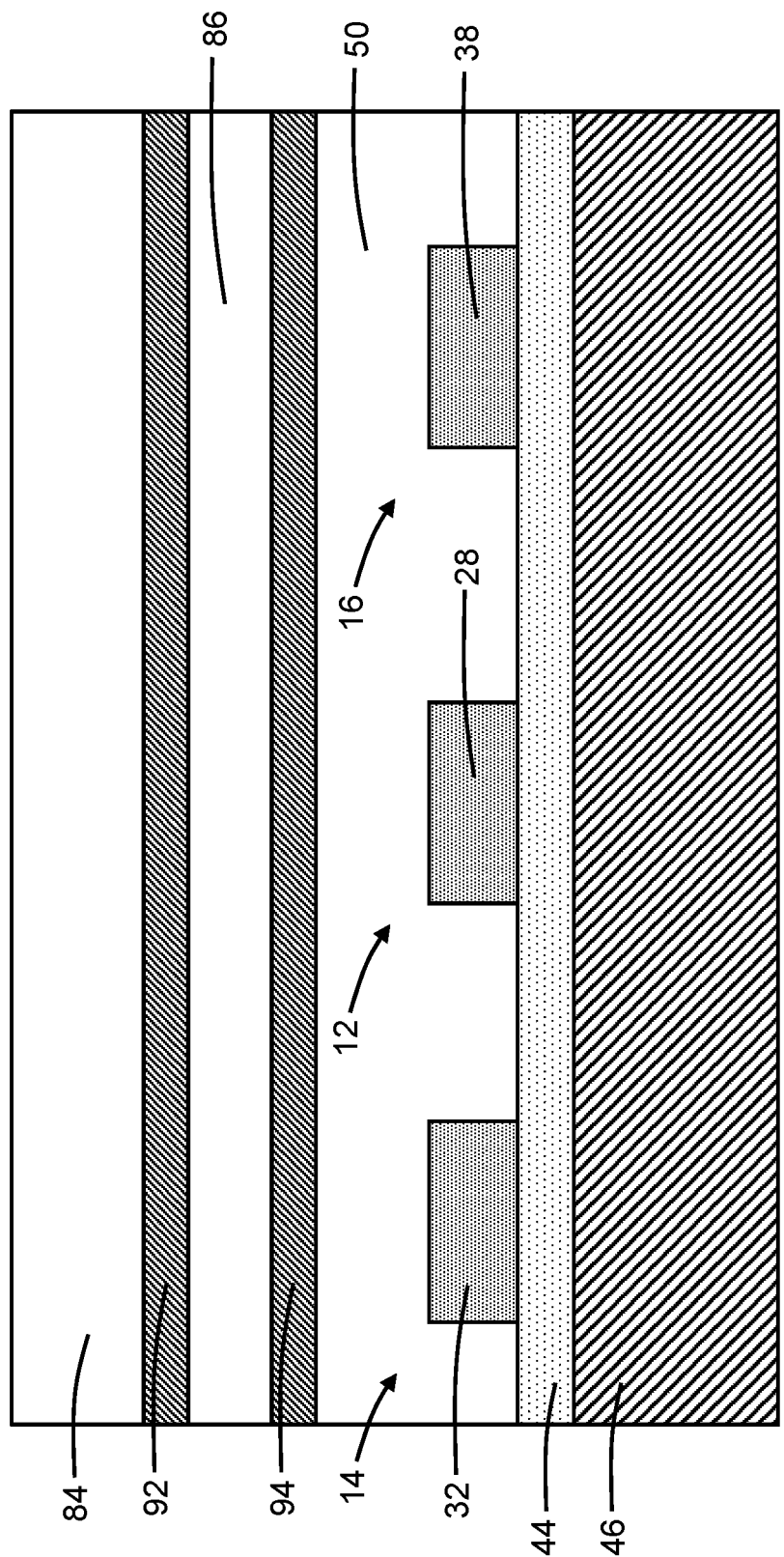
FIG. 13 is a cross-sectional view of a structure in accordance with alternative embodiments of the invention.

With reference to FIG. 13 and in accordance with alternative embodiments of the invention, multiple slab layers 92, 94 that are similar to the slab layer 71, but unpatterned, and that are arranged in a layer stack over the waveguide cores 12, 14, 16. The slab layers 92, 94 may be comprised of a dielectric material, such as silicon nitride. The slab layers 92, 94 are continuous and unbroken over the waveguide cores 12, 14, 16 such that each of the slab layers 92, 94 fully overlaps with the waveguide cores 12, 14, 16 and the slab layers 92, 94 fully overlap with each other. A dielectric layer 86, which includes a different material (e.g., silicon dioxide) is positioned in a vertical direction between the slab layer 92 and the slab layer 94.

The slab layers 92, 94 may function to change the mode shape of the light received from the laser 88. For example, a mode shape that is elliptical may be squeezed to a shape having a shorter major axis.

The methods as described above are used in the fabrication of integrated circuit chips. The resulting integrated circuit chips can be distributed by the fabricator in raw wafer form (e.g., as a single wafer that has multiple unpackaged chips), as a bare die, or in a packaged form. The chip may be integrated with other chips, discrete circuit elements, and/or other signal processing devices as part of either an intermediate product or an end product. The end product can be any product that includes integrated circuit chips, such as computer products having a central processor or smartphones.

References herein to terms modified by language of approximation, such as "about", "approximately", and "substantially", are not to be limited to the precise value specified. The language of approximation may correspond to the precision of an instrument used to measure the value and, unless otherwise dependent on the precision of the instrument, may indicate +/−10% of the stated value(s).

References herein to terms such as "vertical", "horizontal", etc. are made by way of example, and not by way of limitation, to establish a frame of reference. The term "horizontal" as used herein is defined as a plane parallel to a conventional plane of a semiconductor substrate, regardless of its actual three-dimensional spatial orientation. The terms "vertical" and "normal" refer to a direction perpendicular to the horizontal, as just defined. The term "lateral" refers to a direction within the horizontal plane.

A feature "connected" or "coupled" to or with another feature may be directly connected or coupled to or with the other feature or, instead, one or more intervening features may be present. A feature may be "directly connected" or "directly coupled" to or with another feature if intervening features are absent. A feature may be "indirectly connected" or "indirectly coupled" to or with another feature if at least one intervening feature is present. A feature "on" or "contacting" another feature may be directly on or in direct contact with the other feature or, instead, one or more intervening features may be present. A feature may be "directly on" or in "direct contact" with another feature if intervening features are absent. A feature may be "indirectly on" or in "indirect contact" with another feature if at least one intervening feature is present. Different features may "overlap" if a feature extends over, and covers a part of, another feature with either direct contact or indirect contact.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A structure for an edge coupler, the structure comprising:
   a first waveguide core including a first inverse taper;
   a second waveguide core including a second inverse taper;
   a third waveguide core including a third inverse taper laterally positioned between the first inverse taper and the second inverse taper;
   a fourth waveguide core including a fourth inverse taper positioned to overlap with the first inverse taper; and
   a fifth waveguide core including a fifth inverse taper positioned to overlap with the second inverse taper,
   wherein the first waveguide core, the second waveguide core, and the third waveguide core comprise single-crystal silicon, and the fourth waveguide core and the fifth waveguide core comprise silicon nitride.

2. The structure of claim 1 further comprising:
   a sixth waveguide core including a sixth inverse taper that is laterally positioned between the fourth inverse taper and the fifth inverse taper.

3. The structure of claim 2 wherein the sixth inverse taper is positioned to overlap with the third inverse taper.

4. The structure of claim 3 wherein the fourth waveguide core, the fifth waveguide core, and the sixth waveguide core each include an end, the end of the fourth waveguide core terminates the fourth inverse taper, the end of the fifth waveguide core terminates the fifth inverse taper, the end of the sixth waveguide core terminates the sixth inverse taper, and the end terminating the sixth inverse taper is longitudinally offset relative to the end terminating the fourth inverse taper and the end terminating the fifth inverse taper.

5. The structure of claim 3 wherein the first waveguide core, the second waveguide core, and the third waveguide core each include an end, the end of the first waveguide core terminates the first inverse taper, the end of the second waveguide core terminates the second inverse taper, the end of the third waveguide core terminates the third inverse taper, and the end terminating the third inverse taper is longitudinally offset relative to the end terminating the first inverse taper and the end terminating the second inverse taper.

6. The structure of claim 1 further comprising:
a dielectric layer comprised of a dielectric material that is positioned between the first inverse taper and the fourth inverse taper and positioned between the second inverse taper and the fifth inverse taper.

7. The structure of claim 1 further comprising:
a sixth waveguide core including a sixth inverse taper that is positioned to overlap with the fourth inverse taper; and
a seventh waveguide core including a seventh inverse taper that is positioned to overlap with the fifth inverse taper.

8. The structure of claim 1 further comprising:
a handle substrate that includes a cavity defining an edge, wherein the fourth waveguide core and the fifth waveguide core each include an end positioned adjacent to the edge of the cavity, the end of the fourth waveguide core terminates the fourth inverse taper, and the end of the fifth waveguide core terminates the fifth inverse taper.

9. The structure of claim 8 further comprising:
a laser positioned in the cavity adjacent to the edge of the cavity.

10. The structure of claim 8 wherein the first waveguide core, the second waveguide core, and the third waveguide core each include an end positioned adjacent to the edge of the cavity, the end of the first waveguide core terminates the first inverse taper, the end of the second waveguide core terminates the second inverse taper, the end of the third waveguide core terminates the third inverse taper, and the end terminating the third inverse taper is longitudinally offset relative to the end terminating the first inverse taper and the end terminating the second inverse taper in a direction away from the edge of the cavity.

11. A structure for an edge coupler, the structure comprising:
a substrate that includes a cavity defining an edge;
a first waveguide core including a first inverse taper;
a second waveguide core including a second inverse taper;
a third waveguide core including a third inverse taper laterally positioned between the first inverse taper and the second inverse taper;
a fourth waveguide core including a fourth inverse taper positioned to overlap with the first inverse taper; and
a fifth waveguide core including a fifth inverse taper positioned to overlap with the second inverse taper,
wherein the first waveguide core, the second waveguide core, the third waveguide core, the fourth waveguide core, and the fifth waveguide core each include an end positioned adjacent to the edge of the cavity, the end of the first waveguide core terminates the first inverse taper, the end of the second waveguide core terminates the second inverse taper, the end of the third waveguide core terminates the third inverse taper, the end of the fourth waveguide core terminates the fourth inverse taper, the end of the fifth waveguide core terminates the fifth inverse taper, and the end terminating the third inverse taper is longitudinally offset relative to the end terminating the first inverse taper and the end terminating the second inverse taper in a direction away from the edge of the cavity.

12. The structure of claim 11 further comprising:
a laser positioned in the cavity adjacent to the edge of the cavity.

13. The structure of claim 11 further comprising:
a dielectric layer comprised of a dielectric material that is positioned between the first inverse taper and the fourth inverse taper and positioned between the second inverse taper and the fifth inverse taper.

14. The structure of claim 11 further comprising:
a sixth waveguide core including a sixth inverse taper that is positioned to overlap with the fourth inverse taper; and
a seventh waveguide core including a seventh inverse taper that is positioned to overlap with the fifth inverse taper.

15. The structure of claim 11 further comprising:
a sixth waveguide core including a sixth inverse taper that is laterally positioned between the fourth inverse taper and the fifth inverse taper.

16. The structure of claim 15 wherein the sixth inverse taper is positioned to overlap with the third inverse taper.

17. A method of forming a structure for an edge coupler, the method comprising:
forming a first waveguide core including a first inverse taper, a second waveguide core including a second inverse taper, and a third waveguide core including a third inverse taper laterally positioned between the first inverse taper and the second inverse taper; and
forming a fourth waveguide core including a fourth inverse taper that is positioned to overlap with the first inverse taper, and a fifth waveguide core including a fifth inverse taper positioned to overlap with the second inverse taper,
wherein the first waveguide core, the second waveguide core, and the third waveguide core comprise single-crystal silicon, and the fourth waveguide core and the fifth waveguide core comprise silicon nitride.

18. The method of claim 17 further comprising:
forming a cavity in a handle substrate;
wherein the fourth waveguide core and the fifth waveguide core each include an end positioned adjacent to an edge of the cavity, the end of the fourth waveguide core terminates the fourth inverse taper, and the end of the fifth waveguide core terminates the fifth inverse taper.

19. The method of claim 18 further comprising:
positioning a laser in the cavity adjacent to the edge of the cavity.

20. The method of claim 19 further comprising:
forming a sixth waveguide core including a sixth inverse taper that is laterally positioned between the fourth inverse taper and the fifth inverse taper,
wherein the sixth inverse taper is positioned to overlap with the third inverse taper.

* * * * *